May 15, 1923.

I. LUNDGAARD

PYROMETER

Filed April 28, 1921

1,455,633

Inventor
Ivar Lundgaard
by his attorney
Farnum F. Dorsey

Patented May 15, 1923.

1,455,633

UNITED STATES PATENT OFFICE.

IVAR LUNDGAARD, OF ROCHESTER, NEW YORK.

PYROMETER.

Application filed April 28, 1921. Serial No. 465,313.

*To all whom it may concern:*

Be it known that I, IVAR LUNDGAARD, a citizen of the United States, residing at Rochester, in the county of Monroe and State of New York, have invented certain new and useful Improvements in Pyrometers; and I do hereby declare the following to be a full, clear, and exact description of the invention such as will enable others skilled in the art to which it appertains, to make and use the same.

This invention relates particularly to the measurement and control of comparatively high temperatures, such as those of furnaces, tho not essentially limited thereto.

The object of the invention is to produce a pyrometric device of simple and rugged construction, in which a sufficient degree of accuracy may be secured without recourse to delicate electric or other instrumentalities.

To the foregoing end I make use of the principle that a given quantity of air or other gas, forced through an orifice of definite size in a given time, will create a back-pressure varying with changes in the temperature of the air. While I do not claim this principle broadly as novel, the present invention relates to improved means for utilizing it, these means being so constructed and arranged as to eliminate the necessity for exact regulation of either the quantity of air forced through the orifice or the degree of pressure or force used to impel the air.

I accomplish the foregoing result by an arrangement in which the responsive or indicating device is subjected to the differential effect of the pressures in two chambers, one being the pyrometric chamber in which the air is subjected to the temperature which is to be measured, while the other chamber is removed from the influence of said temperature but is also provided with an orifice of small size. By connecting these two chambers with the same means for causing the flow of air through them, all irregularities in the operation of such means are compensated for in the differential effect of the two pressures, so that the instrument will measure the temperature in the pyrometric chamber, or, more exactly, the difference between that temperature and the atmospheric temperature to which the balancing chamber is subjected.

By the use of means for equating the capacity of the balancing-chamber, and the resistance which it opposes to the flow of air, with the corresponding characteristics of the pyrometric chamber, a high degree of accuracy is attained, and it is made practical to use registering or indicating devices located at any desired distance from the furnace of which the temperature is to be measured.

Figure 1:
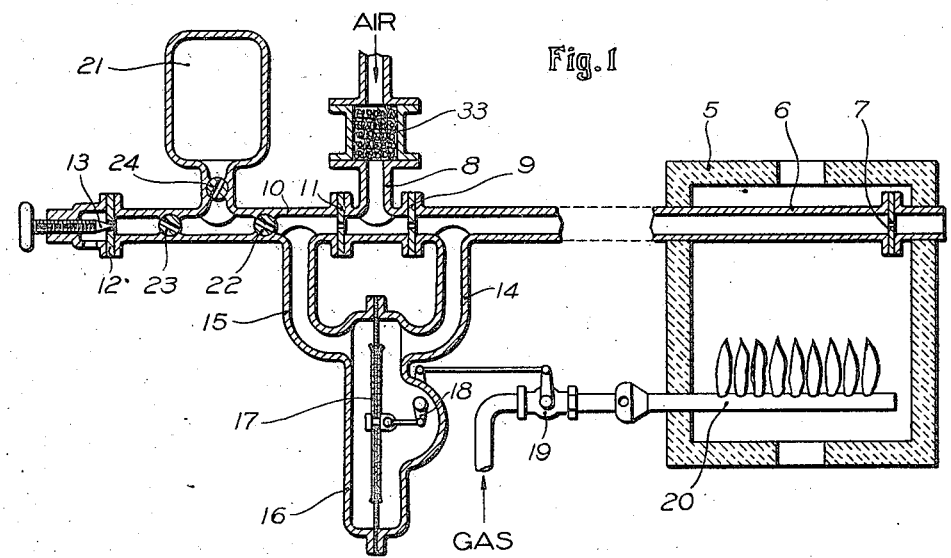
Figure 2:
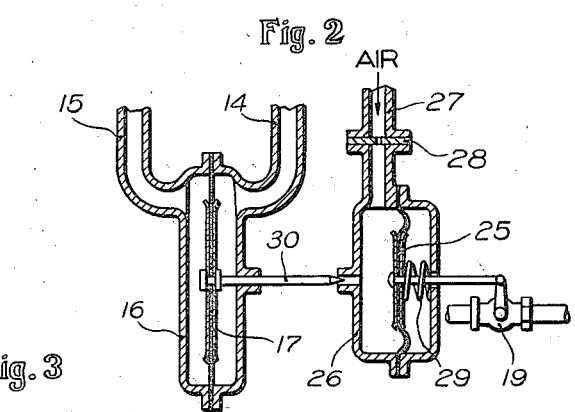
Figure 3:
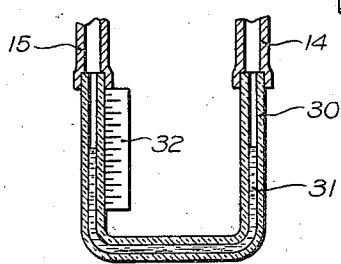

In the accompanying drawings Fig. 1 represents, in a diagrammatic manner, a pyrometric device embodying the present invention, as used to control the temperature of a furnace. Fig. 2 shows a modification of the means for actuating the controlling-valve, and Fig. 3 shows the use of a visual indicator in place of control-mechanism.

In the embodiment of the invention shown in Fig. 1 the pyrometer is arranged to control the temperature of a furnace 5. A tube 6, made of suitable refractory material, such as quartz or chrome-nickel alloy, constitutes the pyrometric chamber and is subjected to the heat of the furnace. A septum 7 in the tube is perforated to form a constricted passage for the gas employed, which in this case is air. The air is supplied, from any convenient source, through a pipe 8, and the flow to the tube 6 is restricted by a perforated septum 9.

The balancing-chamber comprises a tube 10, also fed with air through a perforated septum 11, and is provided with a restricted outlet, through a septum 12. This outlet may be adjusted by a needle-valve 13.

If the inlets to and the outlets from the tubes 6 and 10 be of equal size and the two tubes or chambers be at the same temperature, the pressures within the two chambers, if they are both of small capacity and length, will remain always the same regardless of changes in the pressure of the air-supply. If, however, the chamber 6 be heated by the furnace, the air passing through this chamber will be heated and more pressure will be required to force a given mass of air through the septum 7. The result will be a difference in the pressures in the two chambers. By adjusting the valve 13 the apparatus may be set for any desired normal temperature in the furnace, the pressures in the chambers being equal at this normal temperature, while the pressure in the pyrometric chamber will rise above or fall below that in the balancing-chamber as the temperature rises above or falls below normal.

The indications of the pyrometer are rendered effective, in the arrangement of Fig. 1, by connections, through pipes 14 and 15, to opposite sides of a chamber 16 which is divided by a flexible diaphragm 17. This diaphragm responds to differences in the pressures on its opposite surfaces, and it is used to control the heat of the furnace. For this purpose it is connected, through a suitable mechanism 18, with the feed-valve 19 through which gas is supplied to the burner 20 by which the furnace is heated. If the temperature of the furnace rises above normal the pressure on the right-hand side of the diaphragm exceeds, and the diaphragm moves in a direction to move the valve 19 toward closed position. A fall in the temperature causes an opposite movement of the parts.

Where it is desirable to locate the responsive device at a considerable distance from the furnace, and the capacity of the tube 6 is large owing to its length, if this capacity preponderate greatly over that of the balancing-chamber any change in the pressure of the air-supply will disturb the balance between the pressures in the two chambers, owing to the fact that the chamber of smaller capacity will respond more quickly to the change. While such disturbances will be only temporary they will produce movements in the responsive device which may be undesirable, particularly in the case of a recording pyrometer. Accordingly, I eliminate such disturbances by making the balancing-chamber of a capacity approximately equal to that of the pyrometric chamber. In Fig. 1 this is shown as accomplished by the use of a receptacle 21 attached to the tube 10. The size of this receptacle is, of course, varied with the length and diameter of the tube 6.

Where the length of the tube 6 is great and its diameter is very small in proportion, the effect of capacity in the tube is modified by the resistance of the tube to the flow of air, so that in such a case the balancing-chamber will not necessarily respond equally with the pyrometric chamber to variations in air-pressure, merely by reason of having an equal capacity. To equalize the two chambers in all respects it is desirable, therefore, to make their resistance to air-flow the same under all conditions other than changes in temperature. Accordingly, I introduce valves 22 and 23 in the tube 10 on either side of the capacity-receptacle 21, and a third valve 24 between the tube and the receptacle. By adjusting these valves the effects of resistance and capacity in the balancing-chamber may be made equal to those in the pyrometric chamber for all variations in the pressure of the air-supply.

While the movement of the responsive device or diaphragm 17 may be utilized directly, as in Fig. 1, it may sometimes be desirable to use this device merely as a relay controlling a motor of greater power. An arrangement for this purpose is shown in Fig. 2 where the diaphragm 17 moves an escape-valve 30 controlling an outlet from a diaphragm-chamber 26 which is fed with compressed air through a pipe 27. The air enters through a septum 28 with a restricted opening, so that the pressure in the chamber varies as the valve 30 is moved to more or less open position. A diaphragm 25, connected to the gas-valve 19, is pressed by a spring 29 in a direction to close the valve, and this will result whenever the pressure in the pyrometric chamber rises above that in the balancing-chamber.

In place of or in addition to the controlling function above described, the pyrometer may be used to operate an indicating or recording instrumentality. A simple form of indicating means for this purpose is shown in Fig. 3, where the pipes 14 and 15 are connected to the ends of a glass U-tube 30 containing mercury or other liquid 31. A suitably graduated scale 32 may indicate temperatures directly in accordance with changes in the level of the liquid. While this device will indicate all departures of the temperature from the normal, its indications are only approximate as to the extent of such variations, since the ratio between the pressures in the two chambers is not independent of the pressure of the air-supply except when this ratio is unity. An exact measurement of the temperature at any moment can be obtained, however, by adjusting the valve 13 until the two pressures are balanced, and the position of this valve will then serve as a direct indication of the temperature.

To avoid danger of the clogging of the several restricted air-passages, it is desirable to introduce an air-filter 33 in the supply-pipe 8.

It will be evident that the structural details of the apparatus may be greatly varied without departure from the essence of the invention, of which the scope and essentials are set forth in the following claims.

The invention claimed is:

1. A pyrometer comprising: a chamber connecting two regions of different air-pressures and provided with restricted passages adjacent the points of connection, the chamber being subjected, near one of said passages, to the temperature to be measured; a device responsive to variations of the pressure in the chamber between said passages; and means for subjecting said device to a force varying with and compensating for changes in the difference of pressure in said two regions.

2. A pyrometer comprising: two chambers, each connecting two regions of different air-pressures and provided with restricted passages adjacent the points of connection, each of the chambers being subjected to one of the two temperatures of which the difference is to be measured: and a device responsive to variations in the relative pressures in said chambers between the restricted passages therein.

3. A pyrometer comprising: an elongated pyrometric chamber exposed, at its remote extremity, to a temperature to be measured, and provided, near both extremities, with restricted passages, said chamber connecting regions of different air pressures; a balancing-chamber connecting the same regions of different air-pressures and provided with restricted passages near its points of connection: means for substantially equalizing the air-capacity and resistance of the two chambers; and a device responsive to variations in the relative pressures in said chambers between the restricted pasages therein.

4. A pyrometer comprising: a chamber connecting two regions of different air-pressures, and provided with restricted passages adjacent the points of connection, the chamber being subjected, near one of said passages, to the temperature to be measured; a heat-controlling device responsive to variations of the pressure in the chamber between said passages: and means for subjecting said device to a force varying with and compensating for changes in the difference of pressure between said two regions.

5. A pyrometer comprising: two chambers having a common connection, through restricted passages, with a source of compressed air, each chamber having also a restricted outlet and one chamber being subjected, between its inlet and its outlet, to the temperature to be measured: and a device subjected, in opposite directions, to the respective pressures in the two chambers and movable in response to differences between said pressures.

6. A pyrometer comprising: an elongated tubular pyrometric chamber subjected, near one extremity, to the temperature to be measured: a relatively short but equally capacious balancing-chamber; each of said chambers being provided with restricted inlet and outlet openings; means connecting the inlets of the chambers with a common supply of compressed air; and a device subjected to the pressures in the two chambers and responsive to differences therein.

7. A pyrometer, as set forth in claim 2, in which means are provided for adjusting at least one of said restricted passages independently of the others.

8. A pyrometer, as set forth in claim 5, in which means are provided for adjusting the restricted outlet of that chamber which is not subjected to the temperature to be measured.

IVAR LUNDGAARD.